United States Patent
Zhao et al.

(10) Patent No.: US 12,007,523 B2
(45) Date of Patent: Jun. 11, 2024

(54) SECURITY INSPECTION APPARATUS AND METHOD OF CONTROLLING THE SAME

(71) Applicants: Tsinghua University, Beijing (CN); Nuctech Company Limited, Beijing (CN)

(72) Inventors: Ziran Zhao, Beijing (CN); Yan You, Beijing (CN); Yuanjing Li, Beijing (CN); Xuming Ma, Beijing (CN); Jian Wu, Beijing (CN)

(73) Assignees: Tsinghua University, Beijing (CN); Nuctech Company Limited, Beijing (CN)

( * ) Notice: Subject to any disclaimer, the term of this patent is extended or adjusted under 35 U.S.C. 154(b) by 404 days.

(21) Appl. No.: 17/304,903

(22) Filed: Jun. 28, 2021

(65) Prior Publication Data
US 2021/0325561 A1    Oct. 21, 2021

Related U.S. Application Data

(63) Continuation of application No. PCT/CN2019/110407, filed on Oct. 10, 2019.

(30) Foreign Application Priority Data

Dec. 29, 2018  (CN) .......................... 201811654216.4

(51) Int. Cl.
   *G01V 3/12*  (2006.01)
   *G01V 3/38*  (2006.01)

(52) U.S. Cl.
   CPC . *G01V 3/12* (2013.01); *G01V 3/38* (2013.01)

(58) Field of Classification Search
   CPC . G01S 13/887; G01S 13/89; G01S 2013/0245
   See application file for complete search history.

(56) References Cited

U.S. PATENT DOCUMENTS

| | | | |
|---|---|---|---|
| 11,500,088 B2 | 11/2022 | Qi et al. | |
| 2014/0091965 A1* | 4/2014 | Sheen | G01S 13/90 342/25 A |

(Continued)

FOREIGN PATENT DOCUMENTS

| | | |
|---|---|---|
| CN | 202013428 U | 10/2011 |
| CN | 103616667 A | 3/2014 |

(Continued)

OTHER PUBLICATIONS

International Search Report with Translation for International Application No. PCT/CN2019/110407 dated Jan. 6, 2020 in 6 pages.

(Continued)

*Primary Examiner* — Alvaro E Fortich
*Assistant Examiner* — Adam S Clarke
(74) *Attorney, Agent, or Firm* — Knobbe, Martens, Olson & Bear, LLP

(57) ABSTRACT

The application describes a security inspection apparatus and a method of controlling the same. An example security inspection apparatus includes a body fixed in the field and an electromagnetic imaging device installed on the body. The electromagnetic imaging device includes a two-dimensional multi-input multi-output array panel, including at least one two-dimensional multi-input multi-output sub-array and a control circuit. Each two-dimensional multi-input multi-output sub-array includes transmitting antennas and receiving antennas, with the transmitting antennas and the transmitting antennas being arranged such that equivalent phase centers are arranged in a two-dimensional array. The electromagnetic imaging device further includes a signal processing device configured to reconstruct an image of an inspected object based on an echo signal received and a display device configured to display the reconstructed image of the inspected object.

16 Claims, 11 Drawing Sheets

(56) References Cited

U.S. PATENT DOCUMENTS

| | | | |
|---|---|---|---|
| 2014/0320331 A1 | 10/2014 | Fernandes et al. | |
| 2016/0365631 A1* | 12/2016 | Huang | H01Q 21/08 |
| 2017/0227636 A1* | 8/2017 | Moulder | G01S 13/89 |
| 2017/0343666 A1* | 11/2017 | Manneschi | G01V 3/12 |
| 2018/0301818 A1* | 10/2018 | Welle | G01S 13/88 |
| 2021/0088649 A1 | 3/2021 | Qi et al. | |

FOREIGN PATENT DOCUMENTS

| | | |
|---|---|---|
| CN | 104808201 A | 7/2015 |
| CN | 106093898 A | 11/2016 |
| CN | 106093937 A | 11/2016 |
| CN | 106546981 A | 3/2017 |
| CN | 106772654 A | 5/2017 |
| CN | 206209132 U | 5/2017 |
| CN | 107238868 A | 10/2017 |
| CN | 108051806 A | 5/2018 |
| CN | 108490497 A | 9/2018 |
| CN | 109031284 A | 12/2018 |
| CN | 109444968 A | 3/2019 |
| CN | 109799538 A | 5/2019 |
| CN | 109828241 A | 5/2019 |
| JP | 2010-008274 A | 1/2010 |
| JP | 2018-100972 A | 6/2018 |
| JP | 2018-537679 A | 12/2018 |
| WO | WO2018089068 A1 | 5/2018 |

OTHER PUBLICATIONS

Office Action Issued for Japanese Application No. 2021-538342 dated Jun. 20, 2022, in 3 pages.

Chinese First Office Action dated Jun. 9, 2023, Chinese Patent Application No. 201811654216.4.

* cited by examiner

SECURITY INSPECTION APPARATUS AND METHOD OF CONTROLLING THE SAME

CROSS REFERENCE TO RELATED APPLICATION(S)

This application claims priority to, and is a continuation of, International Application No. PCT/CN2019/110407, which claims priority to Chinese patent Application No. CN201811654216.4, filed on Dec. 29, 2018, the contents of each of the above-recited applications are hereby incorporated herein by reference in their entirety.

TECHNICAL FIELD

The disclosed technology relates to security inspection, and in particular to a security inspection apparatus and a method of controlling the same.

BACKGROUND

Current security inspection technology generally includes manual inspection, hand-held metal detectors, metal detector doors, X-ray machines, explosives measurement and detection, liquid detectors, etc.

Manual inspection has high accuracy but low efficiency, and an inspected person has a poor experience due to physical contact. Hand-held metal detectors and metal detection doors may only operate on metals, and may not detect non-metal dangerous goods. An explosive measurement detector and a liquid detector both have shortcomings of single function and limited application. X-ray machines are not suitable for human security inspections due to ionizing properties of X-rays. Human security inspection apparatus mainly includes X-ray backscatter human imaging device and millimeter wave human imaging device. The X-ray backscattered human imaging device may perform imaging by using a signal scattered back by the X-ray incident on a surface of the human body. Passive terahertz human security inspection system has low image signal-to-noise ratio and poor penetration. A three-dimensional holographic technology based active millimeter wave security gate generally has an imaging rate of 2-3 s/person, which may not achieve real-time imaging and has low efficiency.

Therefore, traditional security inspection apparatus is not suitable for a secretive security inspection in a public place.

SUMMARY

According to one aspect of the disclosed technology, there is provided a security inspection apparatus, including a body fixed in a field and an electromagnetic imaging device installed on the body, the electromagnetic imaging device including: a two-dimensional multiple-input multiple-output array panel, including: at least one two-dimensional multiple-input multiple-output sub-array, wherein each two-dimensional multiple-input multiple-output sub-array includes a plurality of transmitting antennas and a plurality of receiving antennas, a midpoint of a connection line between each transmitting antenna of the plurality of transmitting antennas and a corresponding receiving antenna of the plurality of receiving antennas serves as an equivalent phase center, and the plurality of transmitting antennas and the plurality of receiving antennas are arranged such that the equivalent phase centers are arranged in a two-dimensional array; and a control circuit configured to control the plurality of transmitting antennas to transmit a detection signal in a form of an electromagnetic wave to an inspected object in a preset order, and to control the plurality of receiving antennas to receive an echo signal from the inspected object; a signal processing device connected to the two-dimensional multiple-input multiple-output array panel and configured to reconstruct an image of the inspected object according to the echo signal received; and a display device connected to the signal processing device and configured to display the reconstructed image of the inspected object.

Preferably, a distance between adjacent transmitting antennas and/or a distance between adjacent receiving antennas in each two-dimensional multiple-input multiple-output sub-array is an integer multiple of a wavelength corresponding to one of a plurality of frequencies of the detection signal, and a distance between adjacent equivalent phase centers is half of the wavelength of the detection signal.

Preferably, each two-dimensional multiple-input multiple-output sub-array includes two rows of transmitting antennas arranged in a first direction and two columns of receiving antennas arranged in a second direction perpendicular to the first direction, and the two rows of transmitting antennas and the two columns of receiving antennas form a rectangular pattern.

Preferably, the two-dimensional multiple-input multiple-output sub-array includes a row of transmitting antennas arranged in a first direction and a column of receiving antennas arranged in a second direction perpendicular to the first direction, and the row of transmitting antennas and the column of receiving antennas intersect to form a cross shape.

Preferably, the control circuit is configured to control the plurality of transmitting antennas in each two-dimensional multiple-input multiple-output sub-array to sequentially transmit the detection signal, and control the plurality of receiving antennas in the two-dimensional multiple-input multiple-output sub-array to receive the echo signal; or is configured to control all the transmitting antennas in the two-dimensional multiple-input multiple-output array panel to sequentially transmit the detection signal, and control all the receiving antennas in the two-dimensional multiple-input multiple-output array panel to receive the echo signal.

Preferably, the body has an integrated structure, and the electromagnetic imaging device is installed on a side of the body facing the inspected object.

Preferably, the body includes a first portion and a second portion that are separated from each other, a space between the first portion and the second portion is configured to allow the inspected object to pass through, and the electromagnetic imaging device is installed on a side of the first portion and/or the second portion facing the inspected object.

Preferably, the electromagnetic imaging device further includes a distance measurement device installed on the two-dimensional multi-input multi-output array panel and configured to measure a distance between the inspected object and the two-dimensional multi-input multi-output array panel; and the signal processing device is configured to reconstruct the image of the inspected object based on the echo signal received and the distance between the inspected object and the two-dimensional multi-input multi-output array panel.

Preferably, the security inspection apparatus further includes an alarm device connected to the signal processing device, wherein the signal processing device is further configured to: determine whether the inspected object contains a dangerous article, based on a preset standard according to the reconstructed image of the inspected object, and control the alarm device to give an alarm if the inspected object contains the dangerous article.

Preferably, the detection signal is a microwave millimeter wave with a frequency in a range of 10 GHz~300 GHz.

Preferably, the two-dimensional multi-input multi-output array panel has a length ranging from 10 cm to 200 cm and a width ranging from 10 cm to 200 cm.

According to another aspect of the disclosed technology, there is provided a method of controlling the security inspection apparatus described above, including: controlling the two-dimensional multi-input multi-output array panel to transmit a detection signal to an inspected object and receive an echo signal from the inspected object; and reconstructing an image of the inspected object based on the echo signal received.

Preferably, the reconstructing an image of the inspected object includes reconstructing the image of the inspected object based on a holographic reconstruction algorithm or a backward projection algorithm.

The electromagnetic imaging device in the security inspection apparatus according to the disclosed technology has capabilities of rapid scanning and rapid image reconstruction, and may perform rapid security inspection on a moving human body or other objects without the inspected object being stationary. The body of the security inspection apparatus according to the disclosed technology may be fixed in a variety of complex fields, and may be realized in a single form or may include multiple discrete parts. The security inspection apparatus has a better hiding effect and a wider application range, and may secretly inspect guns, knives, explosives, drugs and other dangerous goods carried by terrorists in concealment, thereby improving safety in public places.

BRIEF DESCRIPTION OF THE DRAWINGS

FIG. 2b shows a schematic diagram of equivalent phase centers of the 2D MIMO antenna array of FIG. 2a.

FIG. 7b shows a schematic diagram of equivalent phase centers of the 2D MIMO antenna array of FIG. 7a.

FIG. 8b shows a schematic diagram of equivalent phase centers of the 2D MIMO antenna array of FIG. 8a.

DETAILED DESCRIPTION OF EMBODIMENTS

Figure 1:
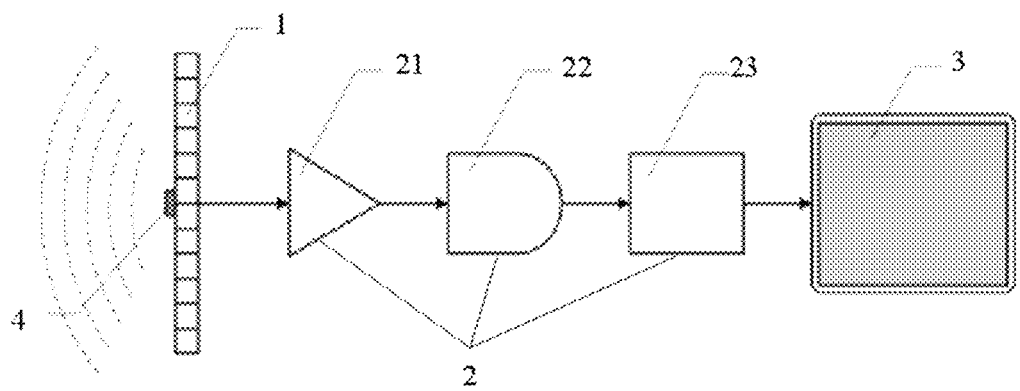
FIG. 1 shows a schematic diagram of an electromagnetic imaging device according to an embodiment of the disclosed technology.

Although the disclosed technology allows various modifications and substitutions, its specific embodiments are shown in the drawings by way of example and will be described in detail herein. However, it should be understood that the drawings and detailed description are not intended to limit the disclosed technology to the specific forms disclosed, but on the contrary, they are intended to cover all modifications, equivalents and substitutions falling within the spirit and scope of the disclosed technology defined by the appended claims. The drawings are for illustration and are not drawn to scale.

The terms "upper", "lower", "left", "right" and the like are used in the specification not to limit the absolute orientation of the element, but to describe the relative position of the element in the view to help understanding. In the specification, "top side" and "bottom side" refer to the orientation of the upper side and the lower side of an upright object in general. "First" and "second" are not for ordering, but for distinguishing different components.

A number of embodiments according to the disclosed technology will be described below with reference to the drawings.

FIG. 1 shows an electromagnetic imaging device according to an embodiment of the disclosed technology. As shown in FIG. 1, the electromagnetic imaging device 10 includes a 2D MIMO (2-Dimensional Multiple-Input Multiple-Output) array panel 1, a signal processing device 2 and a display device 3.

The 2D MIMO array panel 1 may include a 2D MIMO antenna array 11 and a control circuit 12 (not shown). The 2D MIMO antenna array 11 includes at least one 2D MIMO sub-array including a plurality of transmitting antennas and a plurality of receiving antennas. A midpoint of a connection line between each transmitting antenna of the plurality of transmitting antennas and a corresponding receiving antenna of the plurality of receiving antennas serves as an equivalent phase center. The plurality of transmitting antennas and the plurality of receiving antennas are arranged such that the equivalent phase centers are arranged in a two-dimensional array. The control circuit may control the plurality of transmitting antennas to transmit a detection signal in a form of an electromagnetic wave to an inspected object in a preset order, and control the plurality of receiving antennas to receive an echo signal from the inspected object. In some embodiments, the 2D MIMO array panel 1 may be implemented by a 76 GHz-81 GHz chip, which has advantages of high degree of array integration and low cost.

The signal processing device 2 may reconstruct an image of the inspected object based on the echo signals received by the plurality of receiving antennas. In FIG. 1, the signal processing device 2 may include an analog signal processor 21, a digital-to-analog converter (D/A converter) 22 and a digital signal processor 23. The 2D MIMO array panel 1 transmits a detection signal in the form of microwave and millimeter waves to the inspected object. The echo signal generated after the detection signal reaches the inspected object, which carries echo data corresponding to the equivalent phase centers of the 2D MIMO array panel 1, is received by the 2D MIMO array panel 1. The 2D MIMO array panel 1 transmits the echo signal to the analog signal processor 21. The analog signal processor 21 converts the echo signal received in the form of a power signal into an analog signal and transmits the analog signal to the digital-to-analog converter 22. The digital-to-analog converter 22 converts the received analog signal into a digital signal and transmits the digital signal to the digital signal processor 23. The digital signal processor 23 performs an image reconstruction based on the digital signal received.

In some embodiments, the electromagnetic imaging device 10 may further include a distance measurement device 4. The distance measurement device 4 may be installed on the 2D MIMO array panel 1 to measure a distance between the inspected object and the 2D MIMO array panel 1, as shown in FIG. 1. The distance measurement device 4 may be implemented by various distance detection devices, including but not limited to a distance measurement radar, a proximity sensor, and so on. In a case where the distance measurement device 4 is included, the signal processing device 2 in the electromagnetic imaging device 10 may reconstruct the image of the inspected object based on the echo signal received by the 2D MIMO array panel 1 and the distance between the inspected object and the 2D MIMO array panel 1 detected by the distance measurement device 4.

In some embodiments, the electromagnetic imaging device 10 may further include a display device 3 which may be connected to the signal processing device 2 for displaying the image of the inspected object reconstructed by the signal processing device 2. The display device 3 may be implemented as various devices with display functions, such as a display screen, a projector, and so on.

In some embodiments, the electromagnetic imaging device 10 may further include an alarm device (not shown) connected to the signal processing device 2. In this case, the signal processing device 2 may also determine whether the inspected object contains a dangerous article, based on a preset standard according to the reconstructed image of the inspected object, and control the alarm device to issue an alarm if the inspected object contains the dangerous article. The alarm device may be implemented in various forms, including but not limited to a device that gives an alarm by audio, vibration and various other methods, such as a speaker, a vibrator, a siren, etc. An alarm level may also be set. For example, the signal processing device 2 may control the alarm device to issue the alarm with a low volume sound or weak vibration in a case of a low probability of containing the dangerous article, and control the alarm device to give the alarm with a high volume sound or a strong vibration in a case of a high probability of containing the dangerous article (e.g., high may represent greater than a threshold measure).

A structure of the 2D MIMO antenna array 11 in the 2D MIMO array panel 1 according to the embodiments of the disclosed technology will be described below with reference to FIG. 2 to FIG. 8. According to the embodiments of the disclosed technology, the 2D MIMO antenna array may include a plurality of transmitting antennas and a plurality of receiving antennas arranged in an array. The transmitting antennas and the receiving antennas may be installed on a substrate and arranged in various forms as needed. The 2D MIMO antenna array may include at least one 2D MIMO sub-array. In each 2D MIMO sub-array, a distance between adjacent transmitting antennas and/or a distance between adjacent receiving antennas may be an integer multiple (for example, 1 time, 2 times, 3 times, 4 times, 5 times, etc.) of a wavelength of the detection signal. A distance between adjacent equivalent phase centers may be half of the wavelength of the detection signal. A size of the 2D MIMO antenna array may be designed to be the same as an imaging area, or slightly smaller or slightly larger than the imaging area, so as to ensure that the image of the inspected object may be reconstructed correctly. For example, the entire 2D MIMO antenna array (that is, a large array of the plurality of MIMO sub-arrays) may have a side length that ranges from 10 cm to 200 cm.

Figure 2A:
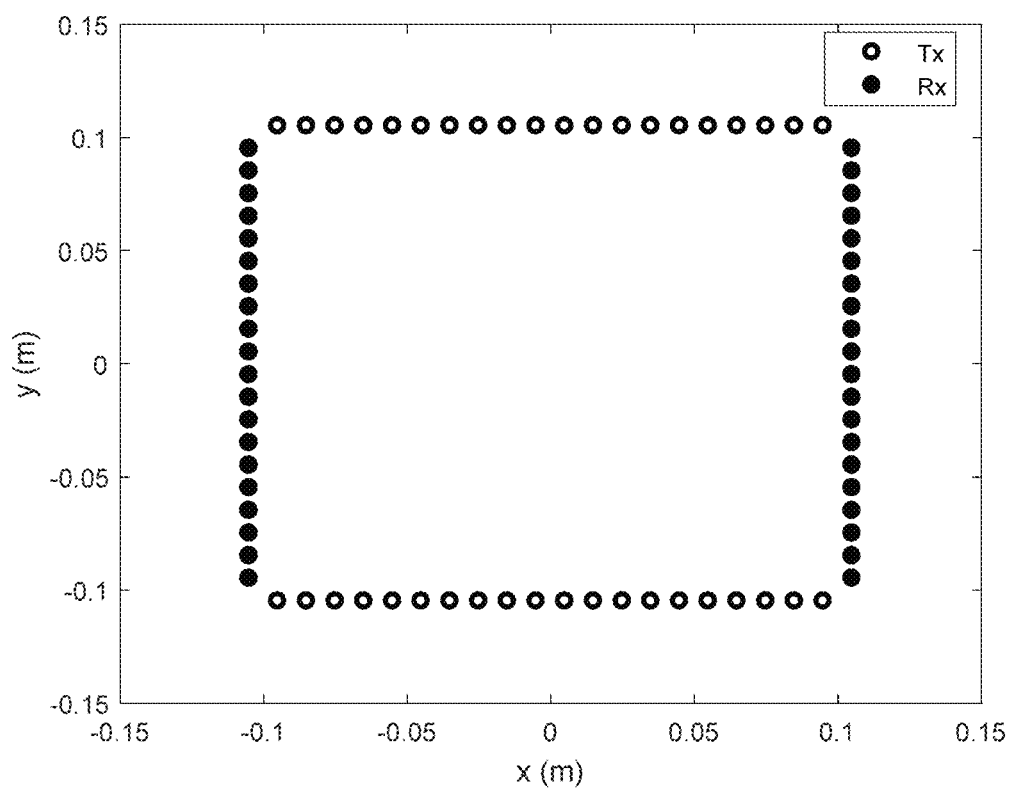
FIG. 2a shows a schematic structural diagram of a 2D MIMO antenna array according to an embodiment of the disclosed technology.
Figure 2B:
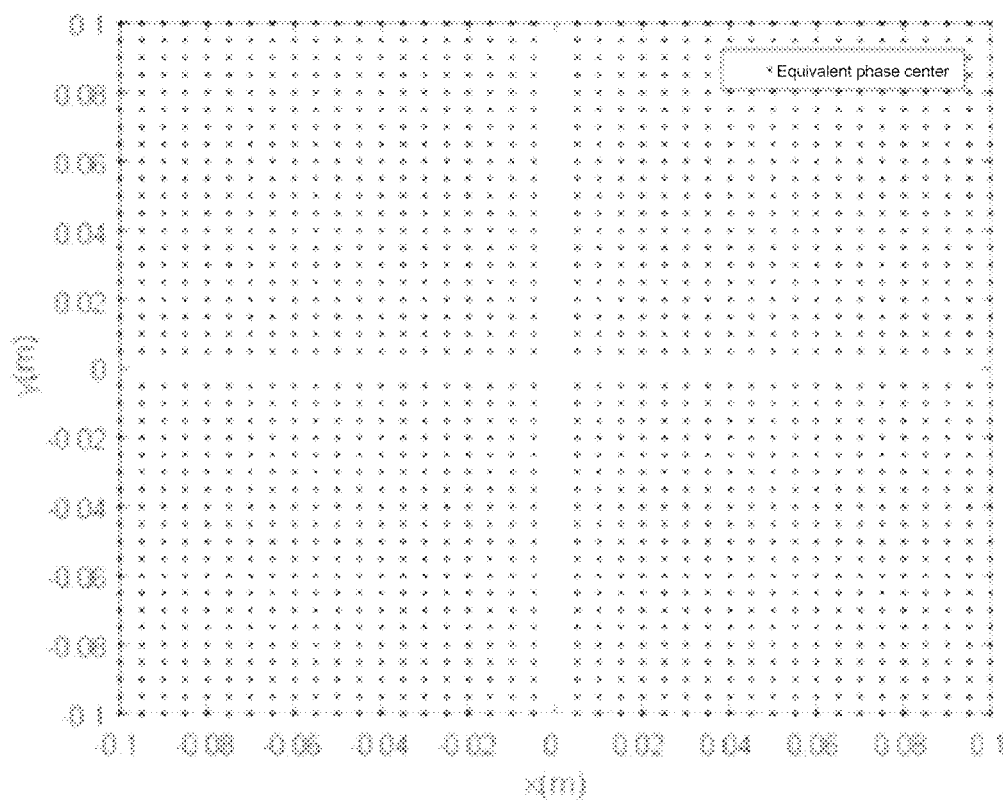

FIG. 2a and FIG. 2b (collectively referred to as FIG. 2) respectively show a schematic structural diagram of a 2D MIMO antenna array according to an embodiment of the disclosed technology and a schematic diagram of equivalent phase centers of the 2D MIMO antenna array.

As shown in FIG. 2a, the 2D MIMO antenna array includes a sub-array including two rows of transmitting antennas Tx arranged in a horizontal direction and two columns of receiving antennas Rx arranged in a vertical direction. The two rows of transmitting antennas Tx and the two columns of receiving antennas Rx form a rectangular pattern. In FIG. 2a, the 2D MIMO antenna array may have a size of 20 cm×20 cm, and include 96 transmitting antennas Tx and 96 receiving antennas Rx. For the sake of brevity, numbers of the transmitting antennas Tx and the receiving antennas Rx shown are only for illustration, not actual numbers.

As shown in FIG. 2b, an equivalent position for transmitting and receiving signals may be represented by a phase center of the antenna. The equivalent position is a physical center of two independent antennas or apertures. In the embodiments of the disclosed technology, the midpoint of the connection line between the transmitting antenna and the corresponding receiving antenna is taken as the equivalent phase center of the two. Under the MIMO architecture, one transmitting antenna Tx corresponds to a plurality of receiving antennas Rx. In the embodiments of the disclosed technology, the receiving antennas Rx and the transmitting antennas Tx are set not in the same position. This system in which the transmitting and receiving antennas are spatially separated may be simulated by using a virtual system in which a virtual position is added between each group of the transmitting antennas Tx and the receiving antennas Rx. This position is called the equivalent phase center. The echo data collected by the group of transmitting and receiving antennas may be equivalent to an echo collected by a transceiver antenna at the equivalent phase center.

In the 2D MIMO antenna array in FIG. 2, a distance between adjacent transmitting antennas is a wavelength λ of the detection signal, a distance between adjacent receiving antennas is also the wavelength λ of the detection signal, and a distance between adjacent equivalent phase centers is λ/2. A sampling interval of imaging (that is, an interval of the equivalent phase centers) is on the order of λ/2, which makes the reconstructed image without artifact superimposition.

Figure 3:
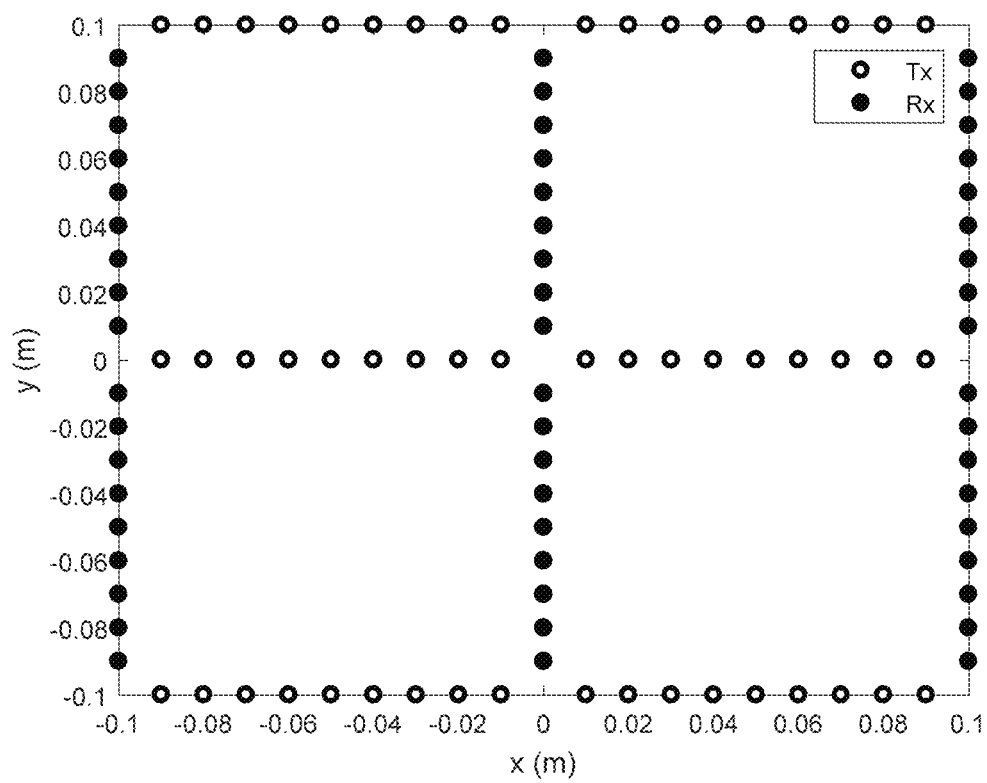
FIG. 3 shows a schematic structural diagram of a 2D MIMO antenna array according to another embodiment of the disclosed technology.

FIG. 3 shows a schematic structural diagram of a 2D MIMO antenna array according to another embodiment of the disclosed technology. As shown in FIG. 3, the 2D MIMO antenna array 21 includes 2×2 sub-arrays. Each sub-array has a size of 10 cm×10 cm, and an overall size of the 2D MIMO antenna array 21 is 20 cm×20 cm. The 2D MIMO antenna array 21 includes 141 transmitting antennas Tx and 141 receiving antennas Rx.

Figure 4:
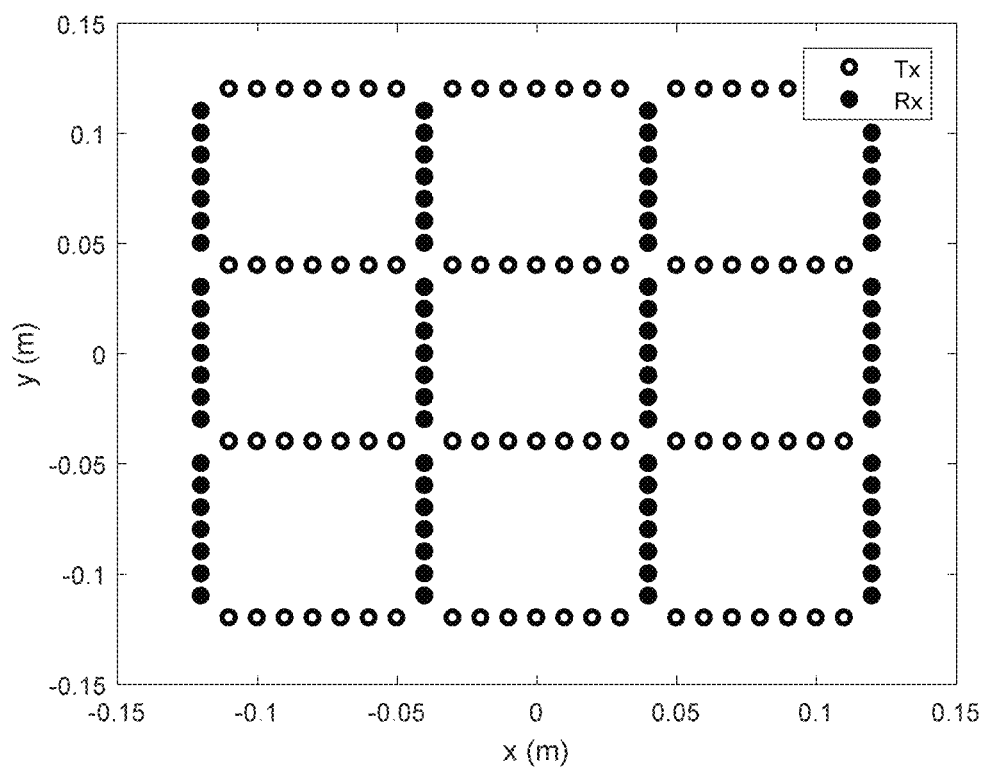
FIG. 4 shows a schematic structural diagram of a 2D MIMO antenna array according to another embodiment of the disclosed technology.

FIG. 4 shows a schematic structural diagram of a 2D MIMO antenna array according to another embodiment of the disclosed technology. As shown in FIG. 4, the 2D MIMO antenna array 21 includes 3×3 sub-arrays. Each sub-array has a size of 8 cm×8 cm, and the overall size of the 2D MIMO antenna array 21 is 24 cm×24 cm. The 2D MIMO antenna array 21 includes 224 transmitting antennas Tx and 224 receiving antennas Rx.

Figure 5:
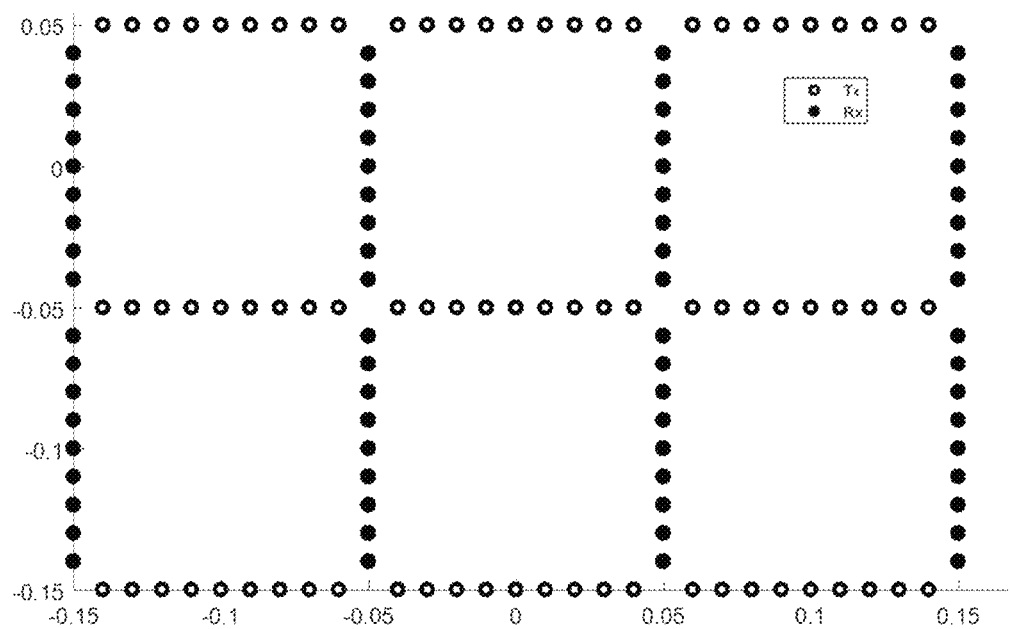
FIG. 5 shows a schematic structural diagram of a 2D MIMO antenna array according to another embodiment of the disclosed technology.

FIG. 5 shows a schematic structural diagram of a 2D MIMO antenna array according to another embodiment of the disclosed technology. As shown in FIG. 5, the 2D MIMO antenna array 21 may include 2×3 sub-arrays. Each sub-array has a size of 10 cm×8 cm, and the overall size of the 2D MIMO antenna array 21 is 20 cm×30 cm. The 2D MIMO antenna array 21 includes 188 transmitting antennas Tx and 213 receiving antennas Rx.

Figure 6:
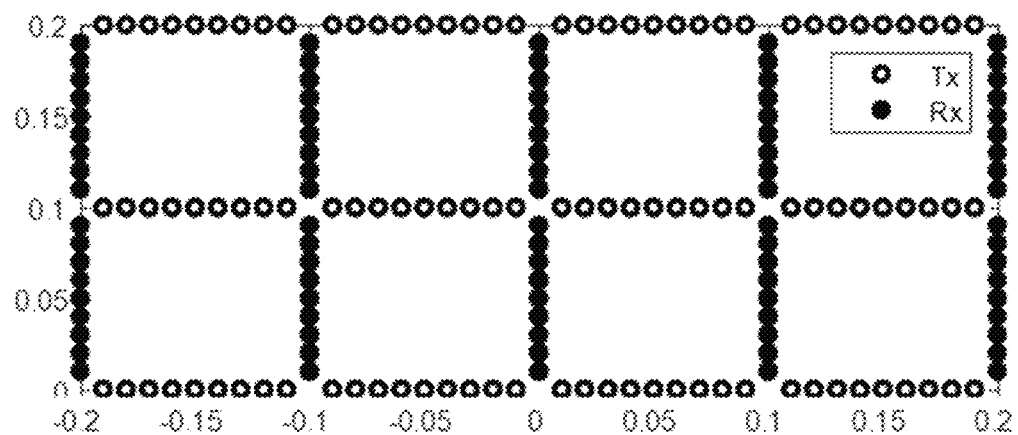
FIG. 6 shows a schematic structural diagram of a 2D MIMO antenna array according to another embodiment of the disclosed technology.

FIG. 6 shows a schematic structural diagram of a 2D MIMO antenna array according to another embodiment of the disclosed technology. As shown in FIG. 6, the 2D MIMO antenna array includes 2×4 sub-arrays. Each sub-array has a size of 10 cm×8 cm, and the overall size of the 2D MIMO antenna array 21 is 20 cm×40 cm. The 2D MIMO antenna array 21 includes 285 transmitting antennas Tx and 235 receiving antennas Rx.

In addition to the 76-81 GHz chip mentioned above, (the control circuit of) the 2D MIMO array panel 1 may also be implemented as a MIMO chip with other frequencies in the range of 10 GHz~300 GHz. The side length of the 2D MIMO antenna array may be selected to be 10 cm~50 cm, preferably 20 cm~40 cm. Table 1 shows the number of the transmitting antennas Tx and the receiving antennas Rx in different frequency bands for two different sub-array sizes in a case where the overall size of the 2D MIMO antenna array is 30 cm×30 cm, where * represents a center frequency. For example, as shown in Table 1, for the 2D MIMO antenna array of 30 cm×30 cm, if the size of the sub-array is 30 cm×30 cm, then for the detection signal in the 10 GHz~20 GHz band, the number of the transmitting antennas is 26 and the number of the receiving antennas is 26. If the size of the sub-array is 15 cm×15 cm, then for the detection signal in the 10 GHz~20 GHz band, the number of the transmitting antennas is 36, the number of the receiving antennas is 36, and so on.

TABLE 1

| Frequency/GHz | Sub-array of 30 cm × 30 cm | Sub-array of 15 cm × cm |
| --- | --- | --- |
| 10-20 | 26 + 26 | 36 + 36 |
| 24-30 | 50 + 50 | 72 + 72 |
| 24-40 | 60 + 60 | 87 + 87 |
| 40-60 | 96 + 96 | 141 + 141 |
| 70-80 | 146 + 146 | 216 + 216 |
| 76-81 | 154 + 154 | 228 + 228 |
| 89-99 | 184 + 184 | 273 + 273 |
| 75-110 | 182 + 182 | 270 + 270 |
| 120* | 236 + 236 | 351 + 351 |
| 140 | 276 + 276 | 411 + 411 |
| 170 | 336 + 336 | 501 + 501 |
| 195-205 | 396 + 396 | 591 + 591 |
| 210 | 416 + 416 | 621 + 621 |
| 220 | 436 + 436 | 651 + 651 |
| 250 | 496 + 496 | 741 + 741 |
| 270-300 | 566 + 566 | 846 + 846 |

Figure 7A:
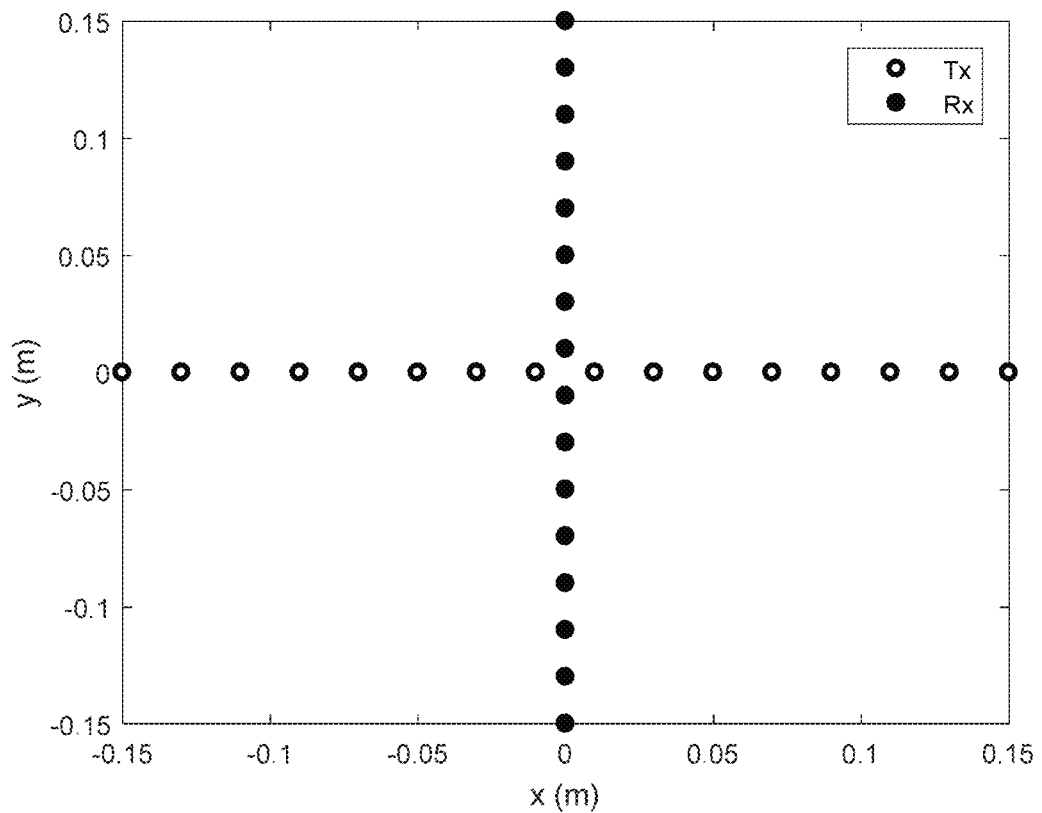
FIG. 7a shows a schematic structural diagram of a 2D MIMO antenna array according to another embodiment of the disclosed technology.
Figure 7B:
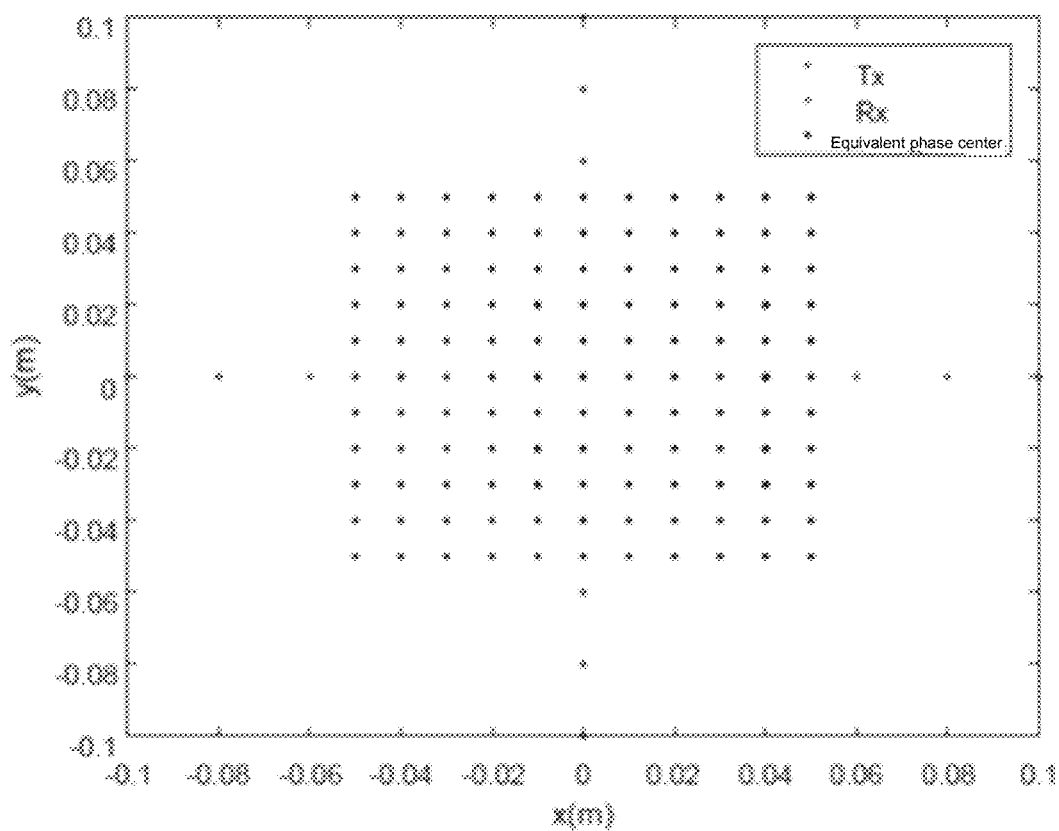

FIG. 7a shows a schematic structural diagram of a 2D MIMO antenna array according to another embodiment of the disclosed technology. FIG. 7b shows a schematic diagram of equivalent phase centers of the 2D MIMO antenna array of FIG. 7a. As shown in FIG. 7a, the 2D MIMO antenna array includes a sub-array including a row of transmitting antennas Tx arranged in the horizontal direction and a column of receiving antennas Rx arranged in the vertical direction. The row of transmitting antennas Tx and the column of receiving antennas Rx intersect to form a cross-shaped pattern. As shown in FIG. 7b, the equivalent phase centers of the 2D MIMO antenna array of FIG. 7a are distributed in a center of the cross-shaped pattern in the form of an array.

Figure 8A:
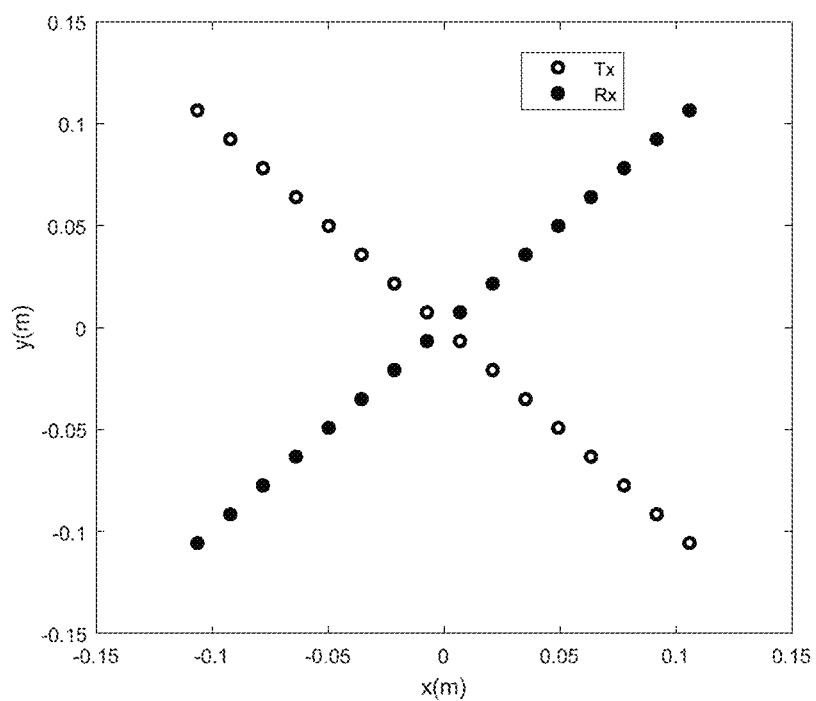
FIG. 8a shows a schematic structural diagram of a 2D MIMO antenna array according to another embodiment of the disclosed technology.
Figure 8B:
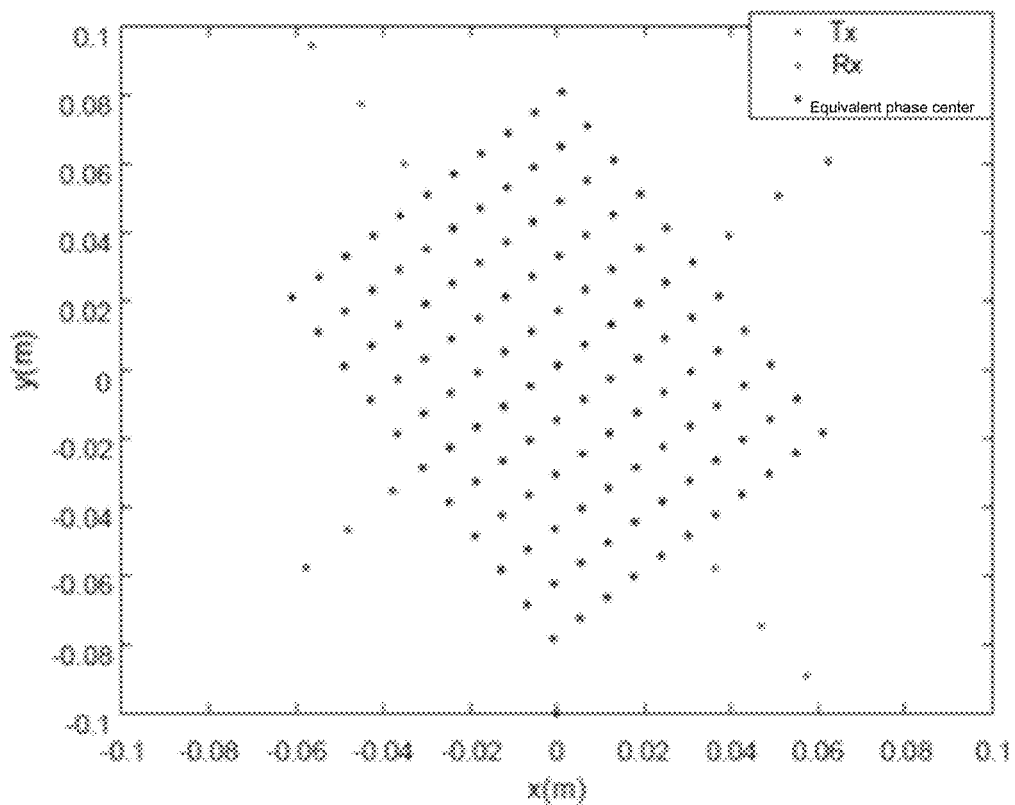

FIG. 8a shows a schematic structural diagram of a 2D MIMO antenna array according to another embodiment of the disclosed technology. FIG. 8b shows a schematic diagram of equivalent phase centers of the 2D MIMO antenna array of FIG. 8a. As shown in FIG. 8a, the 2D MIMO antenna array includes a sub-array including a row of transmitting antennas Tx arranged in a first diagonal direction of the array and a row of receiving antennas Rx arranged in a second diagonal direction of the array. The row of transmitting antennas Tx and the row of receiving antennas Rx cross to form a diagonal cross-shaped pattern on the panel. As shown in FIG. 8b, the equivalent phase centers of FIG. 8b are rotated by 45 degrees (clockwise or counterclockwise) relative to the equivalent phase centers of FIG. 7b. This is because the 2D MIMO antenna array of FIG. 8a is rotated by 45 degrees relative to the 2D MIMO antenna array of FIG. 7a.

It should be clear to those skilled in the art that the above are only examples, and the structure of the 2D MIMO antenna array 11 of the disclosed technology is not limited to this. The size of the sub-array, the size of the array, the arrangement of the antennas in the sub-array, and the number of antennas may be adjusted as desired.

Figure 9:
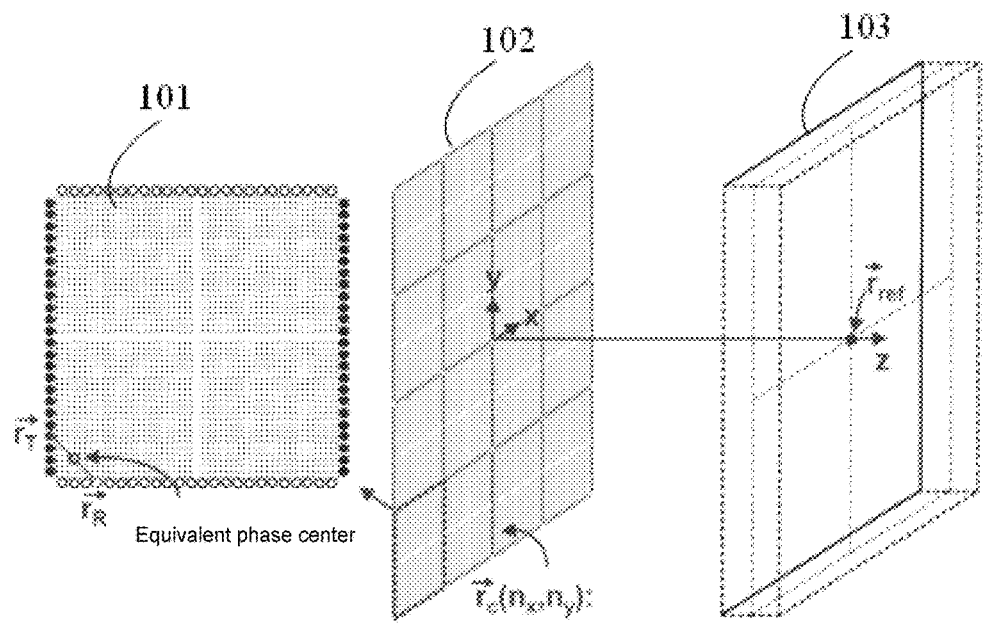
FIG. 9 shows a schematic diagram of a working principle of a 2D MIMO antenna array according to an embodiment of the disclosed technology.

The operation principle of the 2D MIMO antenna array according to the embodiments of the disclosed technology will be described below with reference to FIG. 9. As shown in FIG. 9, a 2D MIMO antenna array including 4×4 sub-arrays is illustrated by way of example. Each sub-array 101 has the structure shown in FIG. 2, the equivalent phase centers formed are arranged in the form of an array 102 (also referred to as an equivalent phase center net), and $(n_x, n_y)$ represents coordinates of the equivalent phase center in the array (the equivalent phase center net). A central reference point of an imaging area 103 of the 2D MIMO antenna array is represented as $\vec{r}_{ref}$, and the inspected object contains a point scatterer positioned at the central reference point. When the security inspection is performed, the 2D MIMO antenna array described above may be controlled by electronic scanning.

As an example, the control circuit may control the transmitting antennas in each sub-array of the 2D MIMO antenna array to sequentially transmit the detection signal, control the receiving antennas to receive the echo signal, then control a next sub-array, and repeat the operation until the scanning of the entire antenna array is completed, so as to obtain all scattering data of the inspected object from different viewing angles. As another example, the control circuit may control all the transmitting antennas in the 2D MIMO antenna array to sequentially transmit the detection signal, and control all the receiving antennas in the 2D MIMO antenna array to receive the echo signal. In a case that the 2D MIMO antenna array includes only one sub-array, the image may be reconstructed by using a holographic reconstruction algorithm as described below. In a case that the 2D MIMO antenna array includes a plurality of sub-arrays, the image may be reconstructed by using a backward projection algorithm as described below.

In the embodiments of the disclosed technology, a microwave millimeter wave with a frequency in the range of 10~300 GHz is used as the detection signal. The wave in this band has no ionization damage to the human body and may be used for human body security inspection. In the embodiments of the disclosed technology, the 2D MIMO antenna array includes a plurality of transmitting antennas and a plurality of receiving antennas arranged in a two-dimensional array, which operate in way of electronic scanning. Electronic scanning has the advantage of fast detection speed. By combining with a three-dimensional holographic algorithm based on Fast Fourier Transform (FFT), real-time imaging may be realized. A transmitting antenna and a corresponding receiving antenna in the 2D MIMO antenna array may generate an equivalent phase center. The echo data collected by a pair of the transmitting antenna and the receiving antenna may be equivalent to the echo collected by a transceiver antenna at the equivalent phase center. The equivalent phase centers are arranged in an array, and the interval between adjacent equivalent phase centers is substantially half of the wavelength $\lambda$ of the detection signal, so that the entire equivalent phase center array is substantially a full array. Further, the sampling interval (that is, the interval of the equivalent phase centers) of the imaging system is in the order of $\lambda/2$, so that there is no artifact superimposition in the image generated, and a clearer image may be formed, thereby improving a speed of image processing.

The electromagnetic imaging device according to the embodiments of the disclosed technology may be installed in the security inspection apparatus fixed in the field. In the embodiments of the disclosed technology, the security inspection apparatus may be implemented in a variety of different forms. An example of the security inspection apparatus according to the embodiments of the disclosed technology is described below with reference to FIG. 10 to FIG. 16.

Figure 10:
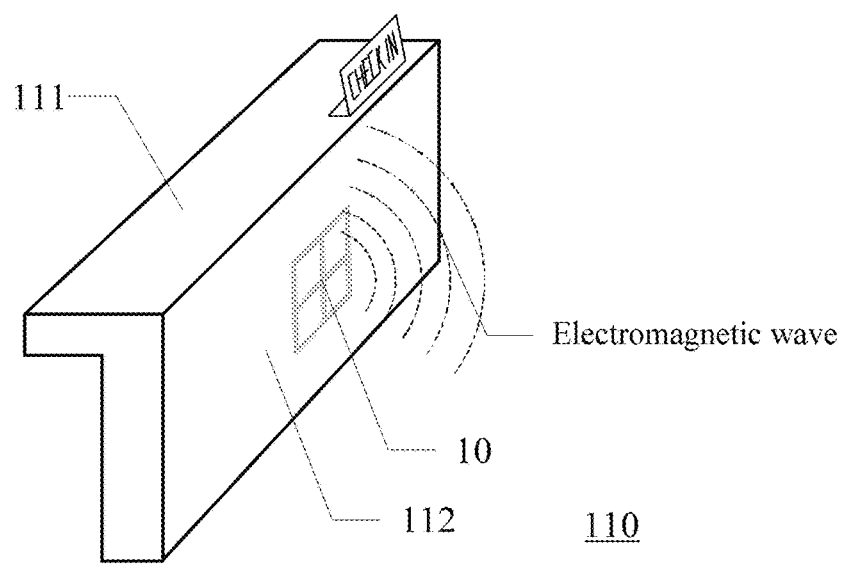
FIG. 10 shows a schematic diagram of a security inspection apparatus according to an embodiment of the disclosed technology.

FIG. 10 shows a schematic diagram of a security inspection apparatus according to an embodiment of the disclosed technology. The security inspection apparatus 110 includes a body and an electromagnetic imaging device 10 installed in the body. In FIG. 10, the body of the security inspection apparatus 110 is a counter in a single form, which may be fixed in a suitable place, including but not limited to a hotel, a hospital, and so on. The body of the security inspection apparatus 110 includes a baffle 112 facing the inspected object (for example, a visitor) and a tabletop 111 perpendicular to the baffle 112. The electromagnetic imaging device 10 (specifically, the 2D MIMO array panel) is installed on the baffle 112, for example, on a surface of the baffle 112 or inside the baffle 112. By transmitting the detection signal in the form of electromagnetic waves to the visitor and receiving the echo signal from the visitor, the electromagnetic imaging device 10 may obtain information about items carried by the visitor and reconstruct the image based on the echo signal, so as to achieve the purpose of security inspection. A display device (not shown) of the electromagnetic imaging device 10 may be installed in a position convenient for viewing, for example, it may be installed on the tabletop 111.

Figure 11:
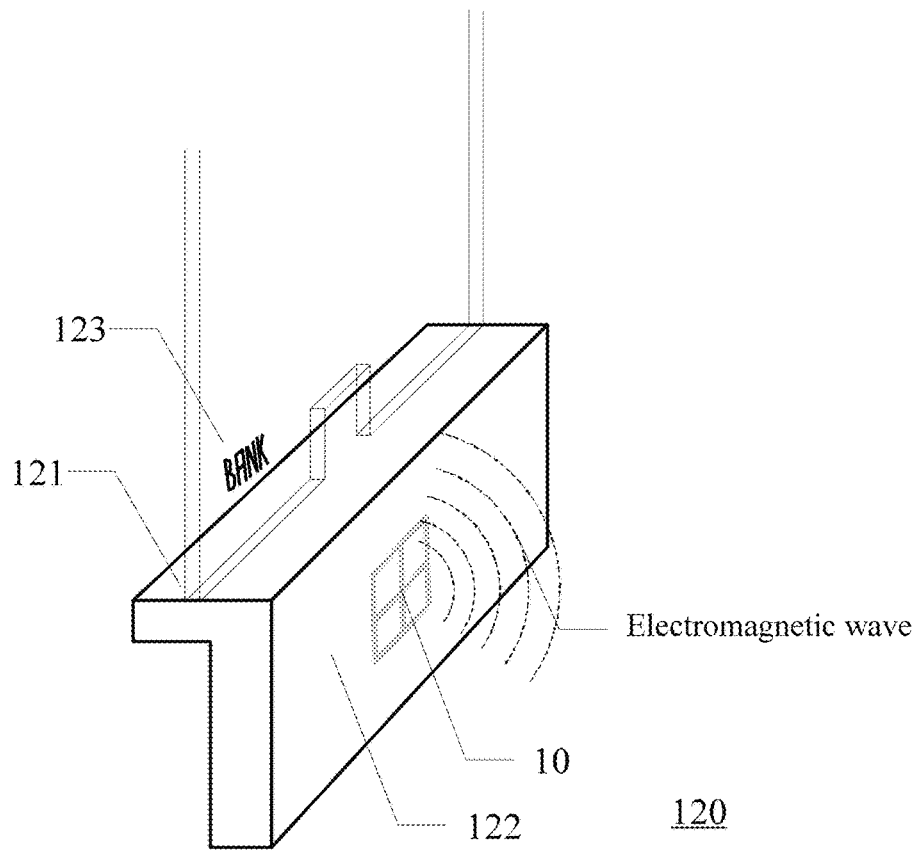
FIG. 11 shows a schematic diagram of a security inspection apparatus according to another embodiment of the disclosed technology.

FIG. 11 shows a schematic diagram of a security inspection apparatus according to another embodiment of the disclosed technology. A security inspection apparatus 120 of FIG. 11 is similar to that of FIG. 10, and the body is also implemented in the form of a counter. The difference is at least that the body of the security inspection apparatus 120 of FIG. 11 further includes an isolation board 123 parallel to the baffle 122 located on the tabletop 121 in addition to the tabletop 121 and the baffle 122 perpendicular to the tabletop 122. The isolation board 123 may be made of a transparent material and used to isolate the visitor from service personnel. The electromagnetic imaging device 10 (specifically, the 2D MIMO array panel) is installed on the baffle 122. The body of the security inspection apparatus 120 in FIG. 11 may be fixedly installed in a place that requires a higher level of security, including but not limited to a bank, a government service agency, and so on.

Figure 12:
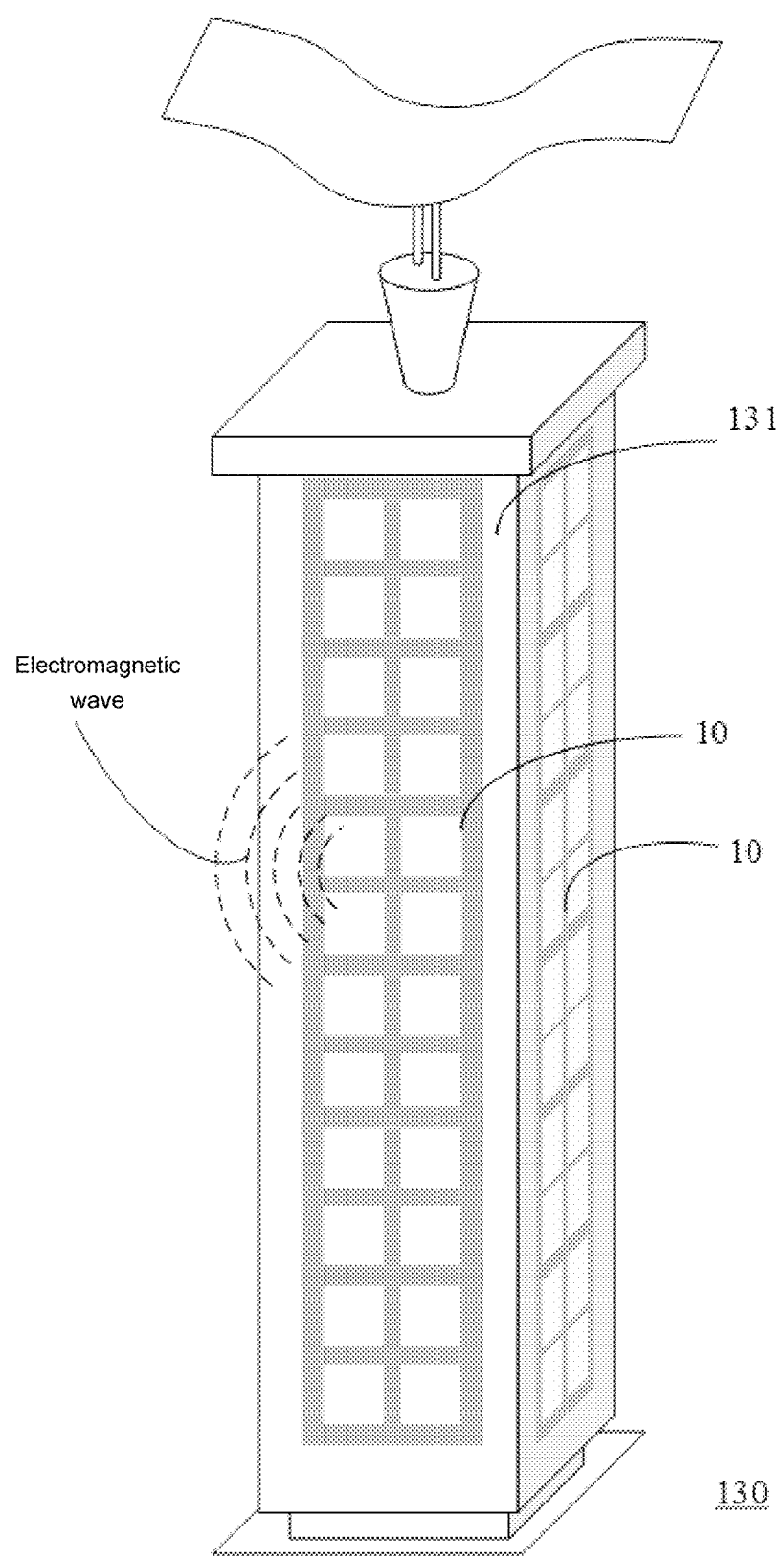
FIG. 12 shows a schematic diagram of a security inspection apparatus according to another embodiment of the disclosed technology.

FIG. 12 shows a schematic diagram of a security inspection apparatus according to another embodiment of the disclosed technology. A security inspection apparatus 130 of FIG. 12 is similar to that of FIG. 10 and FIG. 11, and the body of the security inspection apparatus 130 is also implemented as a single body. The difference is at least that the body of the security inspection apparatus 130 of FIG. 12 is implemented in the form of a single column, and the electromagnetic imaging device 10 is installed on a sidewall 131 of the single column. In FIG. 12, the body of the security inspection apparatus 130 is in the form of a rectangular column with four sidewalls 131, and each sidewall 131 may be provided with one or more electromagnetic imaging devices 10. For example, each sidewall may be provided with one electromagnetic imaging device 10 that includes a 2D MIMO array panel with a size covering the entire column as shown in FIG. 12. In some embodiments, the electromagnetic imaging device 10 may also include a plurality of 2D MIMO array panels that are spliced into a 2D MIMO array panel with a size covering the entire column as shown in FIG. 12. In some embodiments, a plurality of independent electromagnetic imaging devices 10 may be distributed on the column, for example, respectively arranged at different heights, so as to detect different parts of the human body, for example. Certainly, the embodiments of the disclosed technology are not limited to this. The number of the electromagnetic imaging devices 10 and the arrangement on the column may be selected according to needs. For example, a plurality of electromagnetic imaging devices 10 arranged in other ways may be provided on one or more of the four sidewalls 131. The electromagnetic imaging device 10 may be installed on an outer surface or an inner surface of the sidewall 131 or embedded in the sidewall 131, or may be installed in a space defined by the sidewall 131. When the electromagnetic imaging device 10 covers the entire column, a large imaging area may be obtained. For example, the entire human body instead of a part of the human body (such as a waist) may be imaged, so as to obtain more security inspection information and improve a security inspection level. As shown in FIG. 12, a top of the column may be decorated or installed with devices such as a broadcasting station, a communication base station, and so on. The body of the security inspection apparatus 130 may be fixed in various suitable places, including but not limited to an airport, an office building, and so on.

Figure 13:
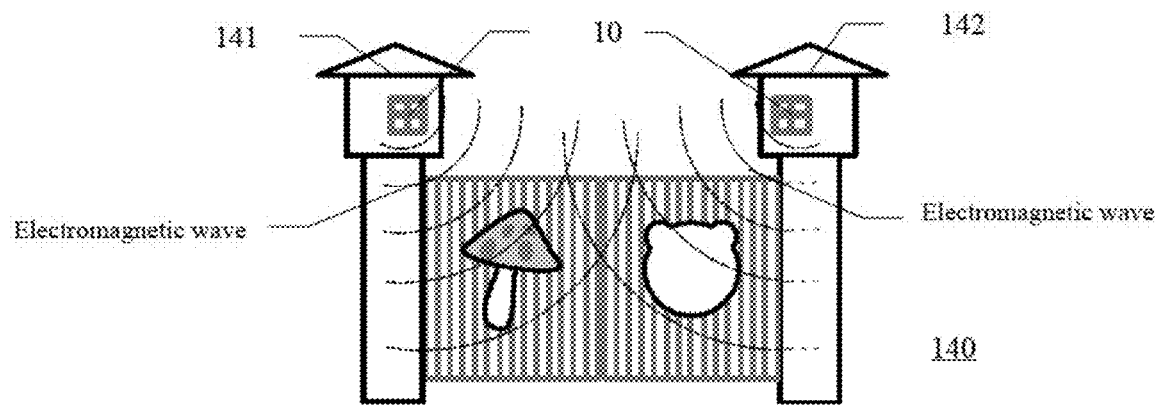
FIG. 13 shows a schematic diagram of a security inspection apparatus according to another embodiment of the disclosed technology.

FIG. 13 shows a schematic diagram of a security inspection apparatus according to another embodiment of the disclosed technology. A security inspection apparatus 140 of FIG. 13 is similar to that of FIG. 10 to FIG. 12. The difference is at least that the body of the security inspection apparatus 140 of FIG. 13 is implemented in a separate form, including a first portion 141 and a second portion 142 that are separated from each other. The first portion 141 and the second portion 142 are both installed with the electromagnetic imaging device 10. In FIG. 13, the first portion 141 and the second portion 142 are implemented in the form of gateposts fixed on both sides of a gate, and the electromagnetic imaging device 10 is installed on the first portion 141 and the second portion 142. In the example of FIG. 13, the first portion 141 and the second portion 142 each include a column body and a decoration on a top of the column body. The electromagnetic imaging device 10 is installed on a side of the decoration on the top of the column body facing the inspected object, such as an entrance side, and it may be located inside or outside the first portion 141 and the second portion 142. However, the embodiments of the disclosed technology are not limited to this. In some embodiments, a plurality of electromagnetic imaging devices 10 may be installed on the entire gatepost. For example, a plurality of electromagnetic imaging devices 10 may be arranged on the entire gatepost toward four directions in a way similar to that shown in FIG. 12. Certainly, they may also be arranged toward other multiple directions. The body of the security inspection apparatus 140 may be fixed in a place where safety needs to be ensured, such as a kindergarten.

Figure 14:
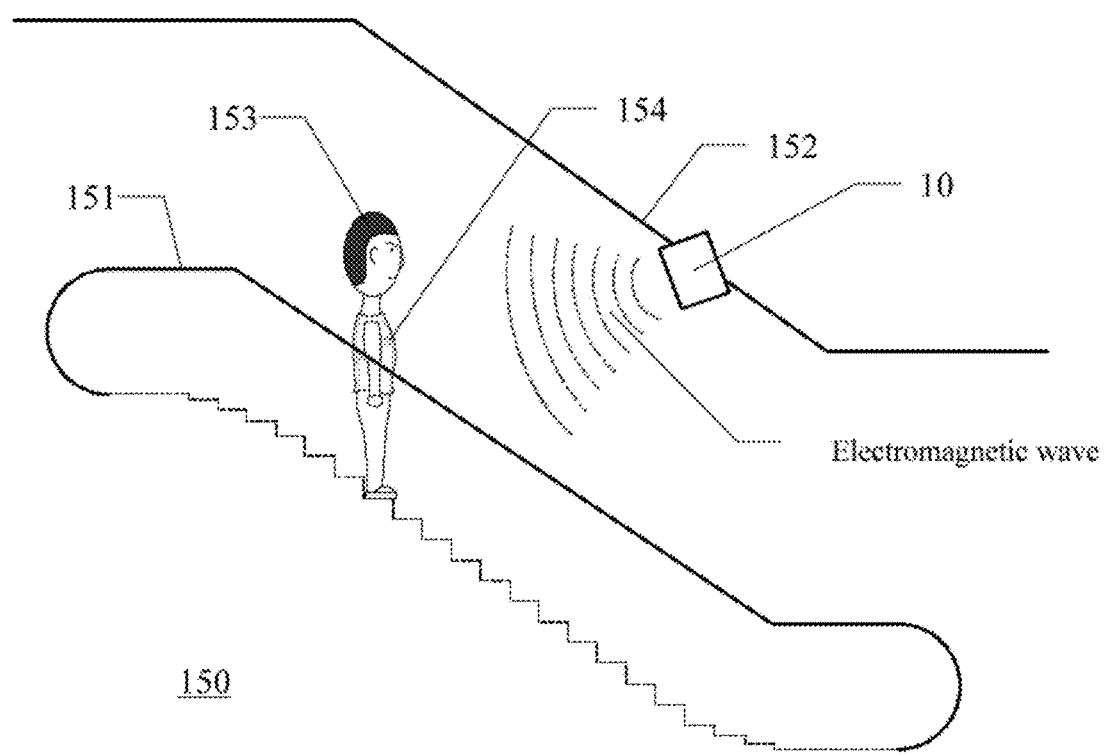
FIG. 14 shows a schematic diagram of a security inspection apparatus according to another embodiment of the disclosed technology.

FIG. 14 shows a schematic diagram of a security inspection apparatus according to another embodiment of the disclosed technology. A security inspection apparatus 150 of FIG. 14 is similar to that of FIG. 13. The difference is at least that the body of the security inspection apparatus 150 of FIG. 14 is implemented in the form of sidewalls of an escalator, including a first sidewall 151 and a second sidewall 152 opposite to each other. The electromagnetic imaging device 10 is installed on a side of the second sidewall 152 facing an inspected object 153 (for example, pedestrian). By transmitting the detection signal to the inspected object 153 and receiving the echo signal from the inspected object 153 and reconstructing the image, it may be detected whether the inspected object 153 is carrying a dangerous article 154.

Figure 15:
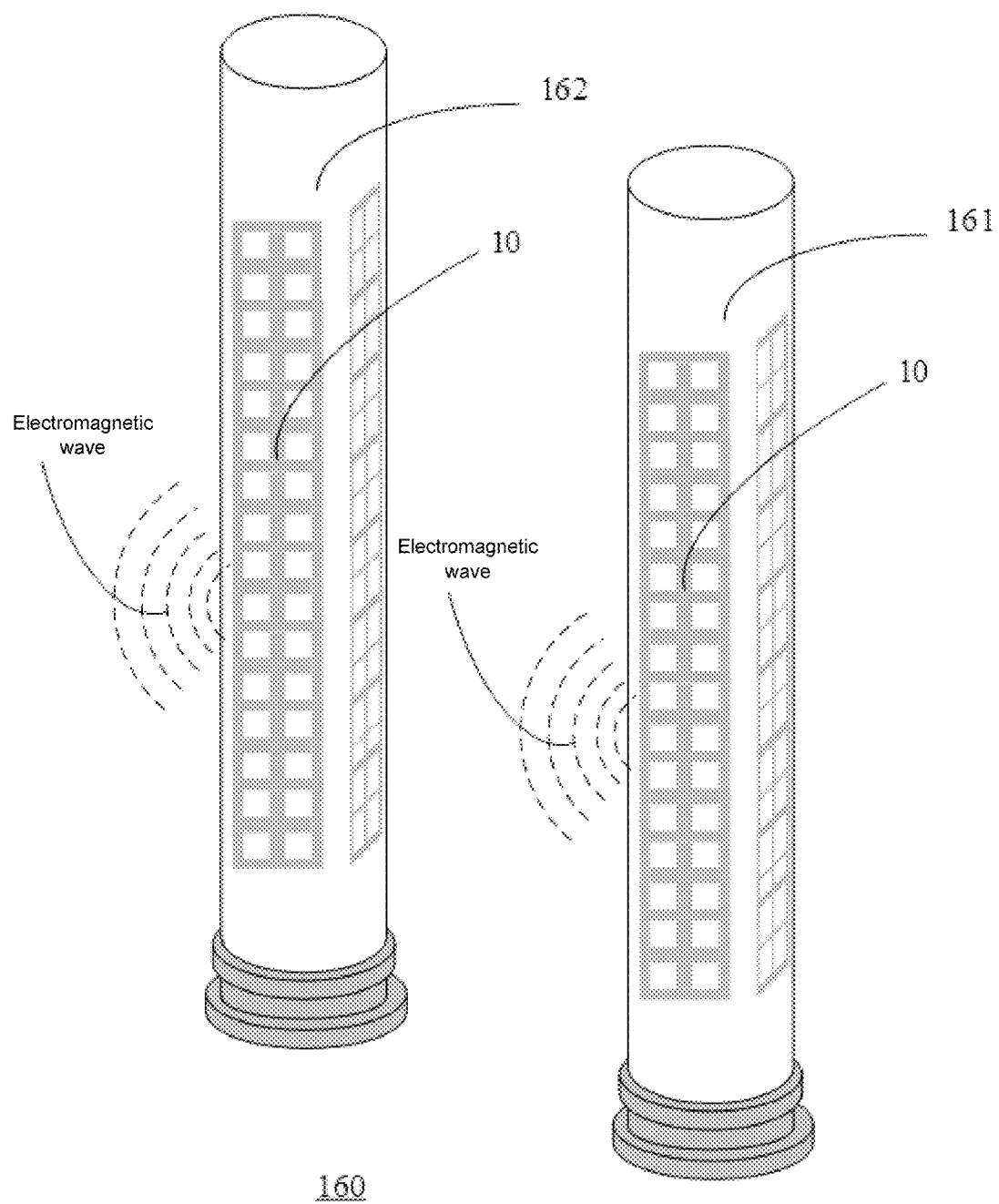
FIG. 15 shows a schematic diagram of a security inspection apparatus according to another embodiment of the disclosed technology.

FIG. 15 shows a schematic diagram of a security inspection apparatus according to another embodiment of the disclosed technology. A security inspection apparatus 160 of FIG. 15 is similar to that of FIG. 13. The difference is at least that the body of the security inspection apparatus 160 of FIG. 15 is implemented in the form of two columns, including a first column 161 and a second column 162. The electromagnetic imaging device 10 is installed in both the first column 161 and the second column 162. In FIG. 15, the first column 161 and the second column 162 are both cylinders and are respectively provided with a plurality of electromagnetic imaging devices 10 facing different directions, for example, facing four directions in a manner similar to that shown in FIG. 12. However, the embodiments of the disclosed technology are not limited to this. The number, arrangement and orientation of the electromagnetic imaging devices 10 on the first column 161 and the second column 162 may be set according to needs. For example, a plurality of electromagnetic imaging devices 10 facing five, six or more directions may be arranged along a circular cross-section of the cylinder. As another example, a passage for pedestrians may be formed between the first column 161 and the second column 162, and the electromagnetic imaging device 10 may be installed on a side of the first column 161 and the second column 162 facing a flow of people. The body of the security inspection apparatus 160 may be fixed in any suitable place, for example, as a decoration or a supporting column of an airport, a hotel, and the like.

Figure 16:
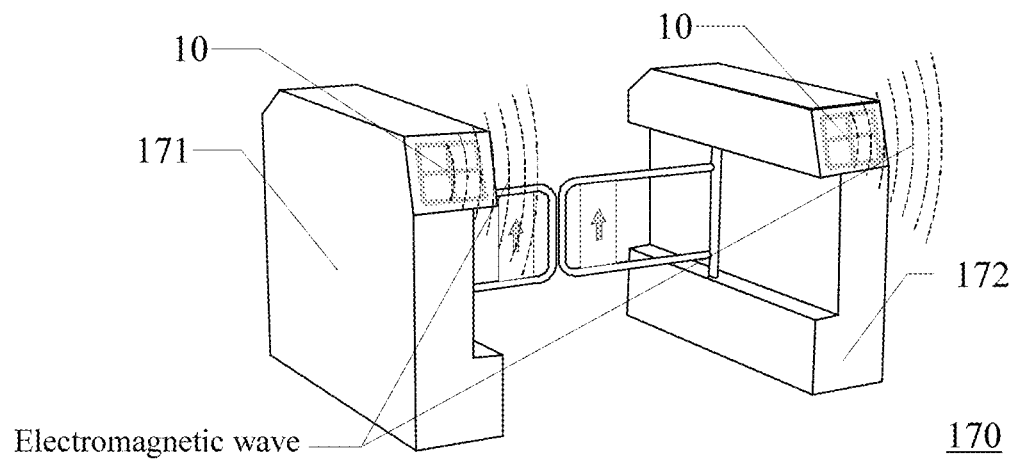
FIG. 16 shows a schematic diagram of a security inspection apparatus according to another embodiment of the disclosed technology.

FIG. 16 shows a schematic diagram of a security inspection apparatus according to another embodiment of the disclosed technology. A security inspection apparatus 170 of FIG. 16 is similar to that of FIG. 13. The difference is at least that the body of the security inspection apparatus 170 of FIG. 16 is implemented in the form of ticket gates, including a first gate 171 and a second gate 172, and a passage is formed between the first gate 171 and the second gates 172. The body of the security inspection apparatus 170 may be fixed in any suitable place, such as a subway ticket gate, a railway ticket gate, an office building entrance, and so on. The electromagnetic imaging device 10 is installed in both the first gate 171 and the second gate 172. In FIG. 16, the electromagnetic imaging device 10 may be installed at an entrance side of the first gate 171 and the second gate 172, for example, at a card swipe box.

The electromagnetic imaging device in the security inspection apparatus according to the disclosed technology has capabilities of rapid scanning and rapid image reconstruction, and may perform rapid security inspection on a moving human body or other objects without the inspected object being stationary. The body of the security inspection apparatus according to the disclosed technology may be fixed in a variety of complex fields, and may be realized in a single form or may include multiple discrete parts. The security inspection apparatus has a better hiding effect and a wider application range, and may secretly inspect guns, knives, explosives, drugs and other dangerous goods carried by terrorists in concealment, thereby improving safety in public places.

Figure 17:
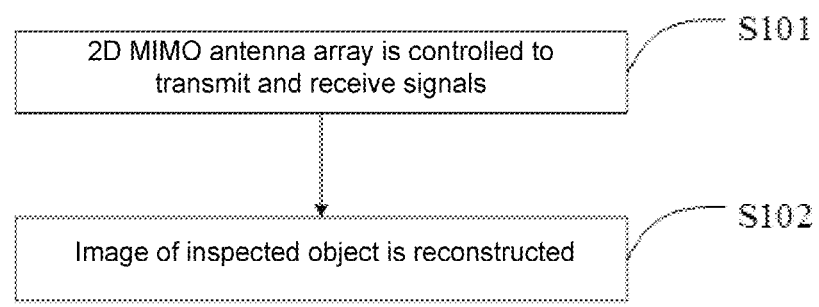
FIG. 17 shows a schematic flowchart of a method of controlling a security inspection apparatus according to an embodiment of the disclosed technology.

FIG. 17 shows a schematic flowchart of a method of controlling a security inspection apparatus according to an embodiment of the disclosed technology.

In step S101, the 2D MIMO antenna array 11 is controlled to transmit a detection signal to the inspected object and receive an echo signal from the inspected object. For example, the control circuit 12 may be used to control the 2D MIMO antenna array 11 to transmit the detection signal to the inspected object and receive the echo signal in the manner described above. The detection signal may be an electromagnetic wave, such as a millimeter wave, specifically a millimeter wave terahertz wave.

In step S102, an image of the inspected object is reconstructed based on the echo signal received. For example, the image of the inspected object may be reconstructed by using a full-system reconstruction algorithm or a backward projection algorithm.

The holographic reconstruction algorithm may be used to realize a real-time reconstruction of the image of the inspected object. The echo data collected by a pair of transmitting and receiving antennas may be equivalent to the echo collected by a transceiver antenna at the equivalent phase center. The signal processing device collects the echo data at the equivalent phase center. Assuming that collected reflection data of the inspected object is $s(n_x, n_y)$, the reflection data is corrected by the following formula to obtain a corrected reflection data matrix:

$$\hat{s}(n_x, n_y) = s(n_x, n_y) \frac{R_o(n_x n_y)}{R_u(n_x, n_y)},$$

where $s(n_x, n_y)$ is an uncorrected scattering data matrix, and $n_x$ and $n_y$ are positions of the equivalent phase center in the equivalent phase center network (that is, row and column indices).

$R_u(n_x, n_y)$ and $R_o(n_x, n_y)$ are calculated by following formulas $$R_u(n_x, n_y) = e^{-jk|\vec{r}_T(n_x,n_y) - \vec{r}_{ref}|} e^{-jk|\vec{r}_{ref} - \vec{r}_R(n_x,n_y)|}, \text{ and}$$

$$R_o(n_x, n_y) = e^{-j2k|\vec{r}_c(n_x,n_y) - \vec{r}_{ref}|}.$$

As shown in FIG. 9, $\vec{r}_{ref}$ represents the reference point of the center of the imaging area 103, j represents an imaginary number, and k represents a space constant.

$R_u(n_x, n_y)$ represents a calculated reflection set. In this case, the following inspected object is sampled as shown in FIG. 9, and the inspected object contains a point scatterer located at $\vec{r}_{ref}$.

$R_o(n_x, n_y)$ represents a calculated reflection set, which is obtained in a case where the equivalent phase center network of multi-input multi-output apertures is sampled (as shown in FIG. 9).

Then a two-dimensional Fourier transform algorithm is used for reconstruction so as to obtain a scattering coefficient of the inspected object:

$$I(x, y) = IFFT_{2D}\left[FFT_{2D}\left[s(n_x, n_y) \frac{R_o(n_x n_y)}{R_u(n_x, n_y)}\right] \cdot e^{-j\sqrt{4k^2 - k_x^2 - k_y^2} z_0}\right].$$

where $I(x, y)$ represents the scattering coefficient of the inspected object, zo represents a distance between the 2D MIMO array panel and the inspected object, j represents an imaginary number, k is a propagation constant, and $k_x$, $k_y$ are respectively spatial propagation constants; $FFT_{2D}$ indicates a two-dimensional Fourier transform, and $IFFT_{2D}$ indicates a two-dimensional inverse Fourier transform.

After completing the two-dimensional aperture scanning, the collected echo data may be expressed as $s(n_x, n_y)$. Finally, combined with the fast Fourier transform-based synthetic aperture holography algorithm, fast reconstruction may be achieved and the imaging is completed. The purpose of the imaging algorithm is to reverse the image of the inspected object, that is, the scattering coefficient of the inspected object, from the echo expression. The Fourier transform-based synthetic aperture holographic algorithm does not need to reconstruct the entire imaging area point by point, but reconstruct the correct imaging area at one time by using the advantages of fast Fourier transform. Therefore, this algorithm may realize fast scanning and fast image reconstruction, thus achieving real-time imaging. The reconstructed image is displayed on the display device. Combined with a suspicious object alarm algorithm, an alarm for a suspicious object may be issued.

The backward projection algorithm originated from the computer tomography technology, and is an accurate imaging algorithm based on time-domain signal processing. The basic idea is that for each imaging point in the imaging area, a delay between the point and the receiving and transmitting antennas is calculated to coherently superimpose the contributions of all echoes thereto, so as to obtain the corresponding pixel value of the point in the image. In this way, a coherent superposition processing is performed on the entire imaging area point by point so that an image of the imaging area is obtained. The backward projection algorithm is naturally easy to implement parallel calculations, and is therefore suitable for a case where the receiving antennas in a plurality of sub-arrays receive the reflected electromagnetic waves at the same time. Although it is necessary to reconstruct every point in the entire imaging area, if the hardware in the processing system adopts GPU or FPGA technology, the reconstruction time may be greatly reduced, and even real-time reconstruction may be realized.

A reconstruction formula may be expressed as $$\hat{O}(x, y, z) = \sum_{\forall k}\sum_{\forall y_r}\sum_{\forall x_r}\sum_{\forall y_t}\sum_{\forall x_t} s(x_t, y_t, x_r, y_r, k) \cdot$$

$$\exp\left(+jk\sqrt{(x_t - x)^2 + (y_t - y)^2 + (z_a - z)^2}\right) \cdot$$

$$\exp\left(+jk\sqrt{(x_r - x)^2 + (y_r - y)^2 + (z_a - z)^2}\right)$$

where $\hat{O}(x,y,z)$ is a scattering coefficient of the inspected object, $z_a$ is an imaging distance, j is an imaginary unit, k is a propagation constant, $s(x_t, y_t, x_r, y_r, k)$ is the echo signal of the inspected object received by a pair of transmitting antenna and receiving antenna, $(x_t, y_t)$ is coordinates of the transmitting antenna, $(x_r, y_r)$ is coordinates of the receiving antenna, and z represents a distance between the 2D MIMO array panel and a certain fault of the inspected object.

Subsequent to the step S102, other steps, such as analyzing the reconstructed image of the inspected object so as to determine whether the inspected object is carrying a dangerous article, may be performed, and if yes, the alarm device is controlled to issue an alarm. For example, the reconstructed image of the inspected object may be compared with a pre-stored template. If a degree of matching with a characteristic template of a certain dangerous article is greater than the preset threshold, it is determined that the inspected object may contain the dangerous article, or otherwise it is determined that the inspected object does not contain the dangerous article. In some embodiments, a probability of containing the dangerous article may also be determined according to the degree of matching. For example, a high degree of matching indicates a high probability of containing the dangerous article, and a low degree of matching indicates a low probability of containing the dangerous article. A method of issuing the alarm includes but is not limited to a screen display, an audio alarm, a vibration alarm, and so on. An alarm level may also be set. For example, in a case of a low probability of containing the dangerous article, the alarm may be issued with a low volume sound or weak vibration, and in a case of a high probability of containing the dangerous article, the alarm may be issued with a high volume sound or a strong vibration.

In addition, the reconstructed image of the inspected object and/or a result of the determination described above may also be presented to a user through the display device. For example, after the image is reconstructed, the reconstructed image may be displayed on the display screen, and then an analysis result may be presented on the display screen. It is also possible to display the reconstructed image and the result of determination on the display screen after the image reconstruction and analysis comparison are completed. A method of presenting the result of determination (such as the dangerous article that may be contained and the probability of containing the dangerous article) may be selected according to needs. In addition to being displayed on the display screen as described above, the result of determination may also be presented by audio, vibration and other methods. For example, the result of determination may be played in the form of voice, or may be indicated by different alarm volumes or vibration intensities. For example, a high-volume alarm means a high probability of containing the dangerous article, and a low-volume alarm means a low possibility of containing the dangerous article.

The embodiments of the disclosed technology further provide a computer-readable medium having instructions stored thereon, and the instructions, when executed by a processor, cause the processor to perform the method of controlling the security inspection apparatus described above.

Those skilled in the art may understand that the embodiments described above are exemplary, and those skilled in the art may make improvements. The structures described in the various embodiments may be combined freely without conflicts in structure or principle.

After describing the preferred embodiments of the disclosed technology in detail, those skilled in the art may clearly understand that various changes and modifications may be made without departing from the scope and spirit of the appended claims, and the disclosed technology is not limited to the exemplary embodiments described in the disclosed technology.

What is claimed is:

1. A security inspection apparatus, comprising a body fixed in a field and an electromagnetic imaging device installed on the body, wherein the electromagnetic imaging device comprising:
    a two-dimensional multiple-input multiple-output array panel, comprising:
        a plurality of two-dimensional multiple-input multiple-output sub-arrays, wherein each two-dimensional multiple-input multiple-output sub-array comprises a plurality of transmitting antennas and a plurality of receiving antennas, a midpoint of a connection line between each transmitting antenna of the plurality of transmitting antennas and a corresponding receiving antenna of the plurality of receiving antennas serves as an equivalent phase center, and the plurality of transmitting antennas and the plurality of receiving antennas are arranged such that the equivalent phase centers are arranged in a two-dimensional array; and
        a control circuit configured to control the plurality of transmitting antennas to transmit a detection signal in a form of an electromagnetic wave to an inspected object in a preset order, and to control the plurality of receiving antennas to receive an echo signal from the inspected object;
    a signal processing device connected to the two-dimensional multiple-input multiple-output array panel and configured to reconstruct an image of the inspected object according to the echo signal received; and
    a display device connected to the signal processing device and configured to display a reconstructed image of the inspected object,
    wherein each two-dimensional multiple-input multiple-output sub-array comprises two rows of transmitting antennas arranged in a first direction and two columns of receiving antennas arranged in a second direction perpendicular to the first direction, and the two rows of transmitting antennas and the two columns of receiving antennas form a rectangular pattern, and
    wherein the body is formed as an integrated structure, the integrated structure comprises a columnar structure, the electromagnetic imaging device comprises the plurality of two-dimensional multiple-input multiple-output sub-arrays, and the plurality of two-dimensional multiple-input multiple-output sub-arrays are arranged on a plurality of sidewalls of the columnar structure, so that the electromagnetic imaging device is distributed on the plurality of sidewalls of the columnar structure.

2. The security inspection apparatus according to claim 1, wherein the control circuit is configured to control all the transmitting antennas in the two-dimensional multiple-input multiple-output array panel to sequentially transmit the detection signal, and control all the receiving antennas in the two-dimensional multiple-input multiple-output array panel to receive the echo signal.

3. The security inspection apparatus according to claim 1, wherein a distance between adjacent transmitting antennas and/or a distance between adjacent receiving antennas in each two-dimensional multiple-input multiple-output sub-array is an integer multiple of a wavelength corresponding to one of a plurality of frequencies of the detection signal, and a distance between adjacent equivalent phase centers is half of the wavelength of the detection signal.

4. The security inspection apparatus according to claim 3, wherein the electromagnetic imaging device further comprises a distance measurement device installed on the two-dimensional multi-input multi-output array panel and the distance measurement device is configured to measure a distance between the inspected object and the two-dimensional multi-input multi-output array panel; and
    wherein the signal processing device is configured to reconstruct the image of the inspected object based on the echo signal received and the distance between the inspected object and the two-dimensional multi-input multi-output array panel.

5. The security inspection apparatus according to claim 1, wherein the two-dimensional multiple-input multiple-output sub-arrays comprises a row of transmitting antennas arranged in a first direction and a column of receiving antennas arranged in a second direction perpendicular to the first direction, and the row of transmitting antennas and the column of receiving antennas intersect to form a cross shape.

6. The security inspection apparatus according to claim 1, wherein the control circuit is configured to control the plurality of transmitting antennas in each two-dimensional multiple-input multiple-output sub-array to sequentially transmit the detection signal, and control the plurality of receiving antennas in the two-dimensional multiple-input multiple-output sub-array to receive the echo signal.

7. The security inspection apparatus according to claim 1, wherein the electromagnetic imaging device is installed on a side of the body facing the inspected object.

8. The security inspection apparatus according to claim 1, wherein the electromagnetic imaging device further comprises a distance measurement device installed on the two-dimensional multi-input multi-output array panel and the distance measurement device is configured to measure a distance between the inspected object and the two-dimensional multi-input multi-output array panel; and wherein the signal processing device is configured to reconstruct the image of the inspected object based on the echo signal received and the distance between the inspected object and the two-dimensional multi-input multi-output array panel.

9. The security inspection apparatus according to claim 1, further comprising an alarm device connected to the signal processing device, wherein the signal processing device is further configured to: determine whether the inspected object contains a dangerous article, based on a preset standard according to the reconstructed image of the inspected object, and control the alarm device to issue an alarm in response to determining the inspected object contains the dangerous article.

10. The security inspection apparatus according to claim 1, wherein the detection signal is a microwave millimeter wave with a frequency in a range of 10 GHz~300 GHz.

11. The security inspection apparatus according to claim 1, wherein the two-dimensional multi-input multi-output array panel has a length ranging from 10 cm to 200 cm and a width ranging from 10 cm to 200 cm.

12. A method of controlling the security inspection apparatus according to claim 1, comprising:

controlling the two-dimensional multi-input multi-output array panel to transmit a detection signal to an inspected object and receive an echo signal from the inspected object; and reconstructing an image of the inspected object based on the echo signal received.

13. The method according to claim 12, wherein the reconstructing an image of the inspected object comprises reconstructing the image of the inspected object based on a holographic reconstruction algorithm or a backward projection algorithm.

14. The method according to claim 12, further comprising:

controlling the plurality of transmitting antennas in each two-dimensional multiple-input multiple-output sub-array to sequentially transmit the detection signal, and controlling the plurality of receiving antennas in the two-dimensional multiple-input multiple-output sub-array to receive the echo signal.

15. The method according to claim 12, further comprising:

controlling all the transmitting antennas in the two-dimensional multiple-input multiple-output array panel to sequentially transmit the detection signal, and controlling all the receiving antennas in the two-dimensional multiple-input multiple-output array panel to receive the echo signal.

16. The method according to claim 12, wherein the detection signal is a microwave millimeter wave with a frequency in a range of 10 GHz~300 GHz.

* * * * *